United States Patent [19]
Rutt

[11] 3,915,193
[45] Oct. 28, 1975

[54] STERILE LIQUID DISPENSING VALVE

[75] Inventor: Richard Dyer Rutt, Wilson, N.Y.

[73] Assignee: The Carborundum Company, Niagara Falls, N.Y.

[22] Filed: Nov. 4, 1974

[21] Appl. No.: 520,509

[52] U.S. Cl. ............ 137/341; 137/614.18; 137/334
[51] Int. Cl.² ......................................... F16K 49/00
[58] Field of Search .......... 137/341, 614.19, 614.18, 137/334

[56] References Cited
UNITED STATES PATENTS

| | | | |
|---|---|---|---|
| 2,500,156 | 3/1950 | Dechant | 137/614.19 X |
| 2,874,719 | 2/1959 | Van Tuyl | 137/614.2 X |
| 3,448,771 | 6/1969 | Bales, Jr. et al. | 137/341 X |

*Primary Examiner*—Arnold Rosenthal
*Attorney, Agent, or Firm*—David E. Dougherty; Robert C. Weber

[57] ABSTRACT

A sterile liquid dispensing valve includes a hollow body having an inlet, an outlet, and inner and outer seats adjacent to the inlet and outlet respectively; an outer closure member; a manual or automatic actuator for advancing or retracting such outer closure member to engage or disengage, respectively, the outer seat; an inner closure member surrounding and slidable relatively to the outer closure member; a helical compression spring surrounding the outer closure member and compressed between the body and inner closure member; and an electrical resistance wire coiled around the outlet and outer seat for heating the same. The spring normally biases the inner closure member to engage the outer closure member for movement therewith, but the inner and outer seats are spaced so that the inner closure member is seated before the outer closure member to ensure closing of the former. The hot wire sterilizes the outlet and vaporizes liquid which may be trapped between the seated inner and outer closure members, whereby such vaporized liquid can escape by forcing the inner closure member to disengage the inner seat against the spring bias.

10 Claims, 4 Drawing Figures

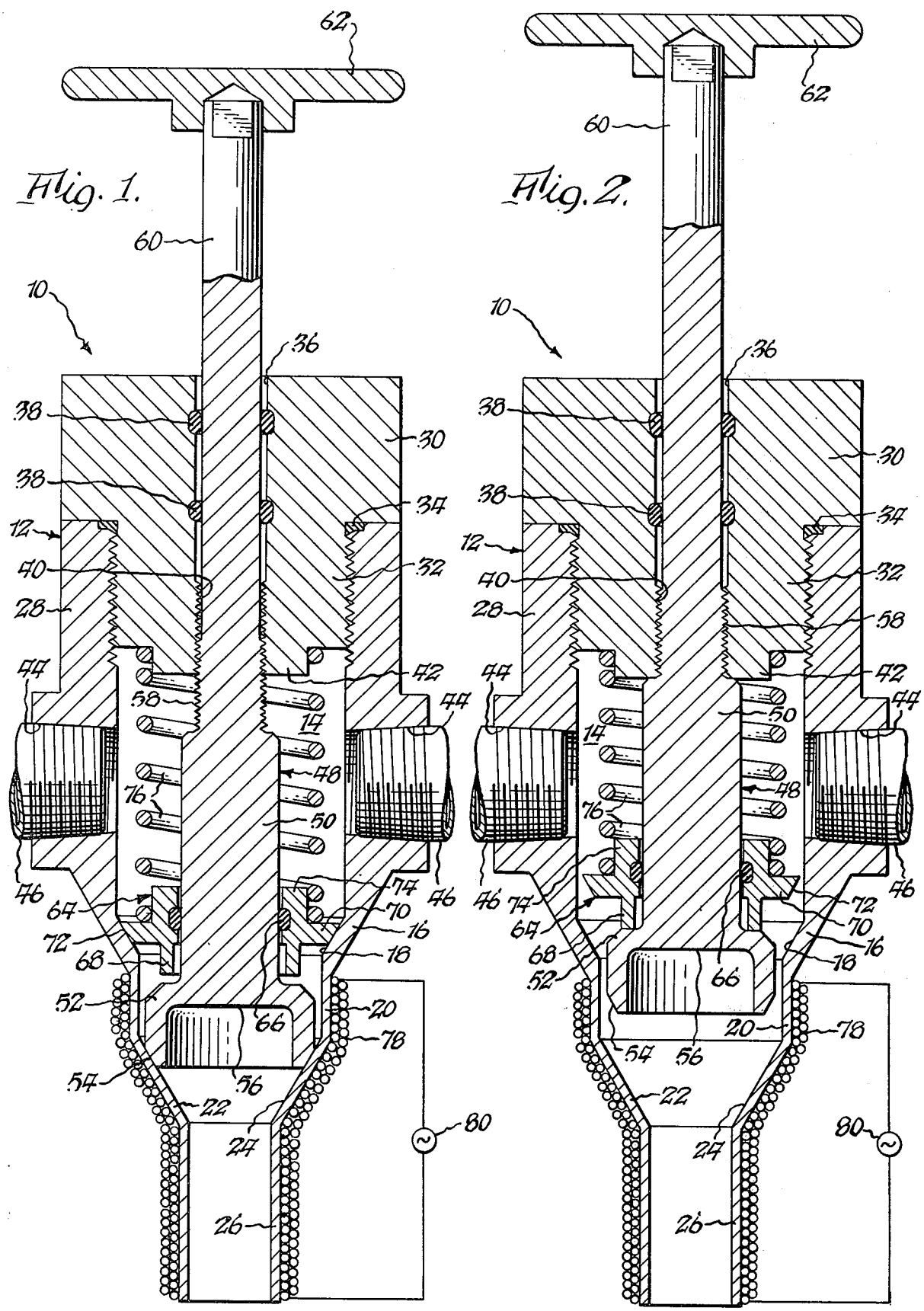

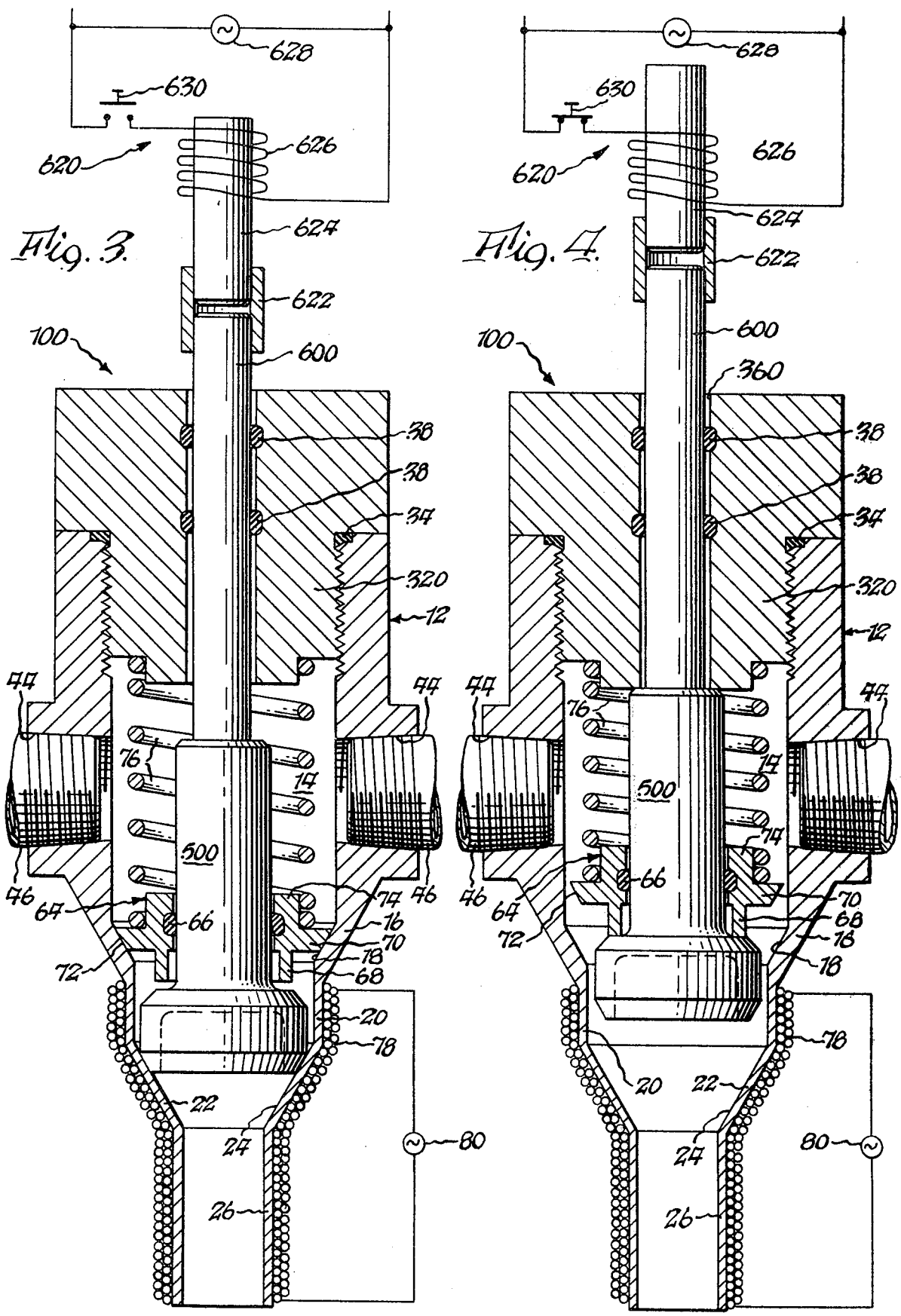

STERILE LIQUID DISPENSING VALVE

BACKGROUND OF THE INVENTION

1. Field of the Invention

This invention relates to valve construction, and more particularly to a new and improved valve for dispensing sterile liquid, especially sterile aqueous liquid such as sterile water.

2. Background of the Prior Art

While it is known to dispense various liquids through valves, and to heat such liquid being dispensed, such as disclosed in U.S. Pat. No. 2,085,470 for a dental syringe and U.S. Pat. No. 2,288,248 for a grease gun, this is for the purpose of preheating and dispensing the liquid at a desired temperature, not for sterilizing such liquid against bacteria nor for dispensing such sterilized liquid.

As a matter of fact, in the normal procedure for dispensing sterile liquid, particularly water, a valve is not used. Rather, the water containing bottle is inserted into an autoclave to sterilize both the bottle and its water content before use. Once a quantity of sterilized water is poured from the bottle, it becomes necessary to throw away the rest or resterilize the bottle and water remaining therein. This is both wasteful and cumbersome, especially in view of the usual intermittent, not continuous, need for tapping sterile water, over an extended period of time. An example of such need is to be found in the microelectronics industry where pure water is required periodically for cleaning printed circuits employed in solid state devices.

SUMMARY OF THE INVENTION

Accordingly, it is a primary object of the present invention to provide a new and improved sterile liquid dispensing valve which is so constructed and designed as to maintain the sterility of the liquid being dispensed, notwithstanding the intermittent dispensation thereof, and therefore eliminates the present need to resterilize the liquid and its container prior to each use. To this end, the inventive valve includes hollow body means having inlet means, outlet means, outer seat means between the inlet means and outlet means, and inner seat means between the inlet means and outer seat means; outer closure means; means for moving the outer closure means to engage and disengage the outer seat means; inner closure means movable relatively to the outer closure means; resilient means normally biasing the inner closure means to engage either the inner seat means or the outer closure means, with the inner and outer seat means being arranged so that during valve closing the inner closure means is seated before the outer closure means to ensure closing of the former; and heating means associated with the body means for sterilizing the outlet means and vaporizing liquid which may be trapped between the inner and outer closure means when seated, whereby such vaporized liquid can escape by forcing the inner closure means to disengage the inner seat means against the bias of the resilient means.

Another object is to provide such a valve which may be opened and closed manually or automatically.

A further object is to provide such a valve wherein the heating means surrounds both the outlet means and outer seat means for sterilizing the same.

Yet another object is to provide such a valve which readily is assembled and disassembled for ease of repair and replacement.

These and additional objects and advantages of the invention will become apparent upon consideration of the following detailed description and accompanying drawings.

BRIEF DESCRIPTION OF THE DRAWINGS

FIG. 1 is a vertical sectional view of a manually actuated embodiment of the inventive valve when closed.

FIG. 2 is a view similar to FIG. 1, but showing the valve when open.

FIG. 3 is a vertical sectional view similar to FIG. 1, but showing an automatically actuated embodiment of the inventive valve when closed.

FIG. 4 is a view similar to FIG. 3, but showing the valve when open.

DESCRIPTION OF THE PREFERRED EMBODIMENTS

Referring to the drawings, and particularly FIGS. 1 and 2, a manually actuated embodiment of the inventive sterile liquid dispensing valve is indicated generally at 10, and the various components of which may be made out of suitable metallic or plastic material, unless otherwise specified or obvious. Valve 10 includes an elongated and hollow, tubular cylindrical valve body 12 provided with an elongated central chamber 14 which is reduced at its lower end by a downwardly and inwardly tapered wall portion 16, the inner surface of which forms an inner or upper valve seat 18. Depending from wall portion 16 is an intermediate and short, cylindrical wall portion 20 which further is reduced at its lower end by a downwardly and inwardly tapered wall portion 22, the upper inner surface portion of which forms an outer or lower valve seat 24. Wall portion 22 terminates at its lower end in an elongated cylindrical spout 26, with such wall portion 22 below outer seat 24 and spout 26 forming an outlet.

The upper end portion 28 of valve body 12 is open and internally threaded for the reception of the externally threaded stem 32 of plug 30 which effectively closes such upper end portion, such closure being sealed by annular gasket 34 between such plug and upper valve body end portion above the engaging threaded portions. Plug 30 is provided with a central through hole 36, the upper portion of which is recessed and provided with preferably a pair of O-rings 38. The upper or "dry" O-ring 38 is provided in addition to the lower or "wet" O-ring as double insurance against possible leakage and contamination of sterile liquid past the stem of outer valve closure member 48. In this connection, it is to be noted that the spacing of the O-rings and the extent of vertical movement of the outer valve closure member are such that a "wet" portion of the retracted stem still can not reach the upper O-ring 38, in the event it is not wiped "dry" by the lower O-ring. The lower portion of opening 36 is internally threaded at 40, with the plug stem terminating in a reduced lower portion or boss 42, all for a purpose to be described below.

Arranged between plug 30 and inner seat 18 is at least one laterally disposed through opening 44 which is tapered inwardly and internally threaded for receiving a similarly tapered and externally threaded pipe 46. As shown, there are two openings 44, one of which could be plugged (not shown). However, preferably, one opening 44 forms an inlet and the other a bypass, such as where the inventive valve is in a circulating line (not shown) for cooling purposes.

Valve 10 also includes an outer or lower valve closure member generally indicated at 48, and which preferably takes the form of an elongated stem 50 terminating at its lower end in an enlarged head 52, the outer lower peripheral margin of which is tapered downwardly and inwardly at 54 to form a sealing surface engaging and mating with outer seat 24 in wall portion 22 of valve body 12. For minimizing heat transfer to the liquid being dispensed, head portion 52 is hollowed out to form a downwardly open central recess 56. Stem 50 also is provided with an intermediate externally threaded portion 58 which operatively engages the internally threaded portion 40 of plug stem 32, as well as an upper or outer end portion 60 which extends through hole 36 and is removably attached in any suitable manner to an actuator or handle 62 for manually actuating outer valve closure member 48, as also described below.

Valve 10 additionally includes an inner or upper valve closure member which is indicated generally at 64 in the form of an annulus which surrounds and is slidable relatively to stem 50 of outer closure member 48. The inner periphery of annulus 64 is recessed and provided with an O-ring seal 66 which permits the desired relative movement while preventing undesirable leakage of liquid. Annulus 64 also includes an elongated lower cylindrical portion 68, the lower end of which is adapted to engage (FIG. 2) or disengage (FIG. 1) the upper end of enlarged head 52, and an enlarged and intermediate, radially projecting portion 70, the outer periphery of which tapers downwardly and inwardly to form a sealing surface 72 adapted to mate with and engage inner seat 18. At its upper end, annulus 64 is completed by a collar or boss portion 74 which is surrounded by the lower end of a coiled helical compression spring, the upper end of which surrounds depending collar portion 42 of plug 32. Such spring is designed to be compressed between body plug 32 and inner closure member 64 so as to normally bias such inner closure member or annulus 64 to engage head 52 of outer closure member 48 (FIG. 2) when valve 10 is open, or inner seat 18 (FIG. 1) when the valve is closed. In the latter case, and when using water, the spring bias produces a pressure such that a back pressure of 15 pounds per square inch guage, is required to lift sealing surface 72 off seat 18, as explained below.

As will be evident from FIG. 1, inner and outer seats 18 and 24 of valve body 12 are arranged in such spaced relationship that inner closure member 64 is seated shortly before outer closure member 48 in order to insure closing of such inner closure member during valve closing.

Valve 10 is completed by heating apparatus in the form of double coils of suitably insulated electrical resistance wire 80 surrounding both the outer valve seat 24 and outlet 22, 26, and preferably intermediate wall portion 20 as well, for sterilizing the outlet and vaporizing any liquid which may be trapped between the seated inner and outer closure members 64 and 48 when valve 10 is closed, as shown in FIG. 1. The opposite ends of coiled wire 78 are connected across a suitable AC power source 80, and a suitable switch (not shown) may be provided for energizing and deenergizing wire 78.

In considering the operation of valve 10, it will be assumed that the valve is closed, as shown in FIG. 1, and that it is desired to open the valve, as shown in FIG. 2, in order to dispense an aliquot of sterile liquid from a sterile liquid reservoir (not shown). It further will be assumed that both valve 10, the various connecting line or lines, such as 46, and such reservoir, are all sterile, such as by autoclaving the entire assembly and/or each of its parts.

In order to open valve 10, it merely is necessary to rotate handle 62, whereupon sealing surface 54 of outer valve closure member 48 disengages lower seat 24, and advances upwardly until the desired engagement is had between the depending lower portion 68 of inner closure member or annulus 64 and the upper end of head 52, whereupon inner sealing surface 72 disengages inner seat 18, with handle 62 being turned until the valve is completely opened as shown in FIG. 2. In a typical installation, six turns of handle 62 may be employed for completely opening and closing valve 10. Once open, the sterile liquid readily can flow through the valve and be dispensed through outlet 26 which is sterilized and maintained in such sterilized condition by the continual heat provided by electrical resistance wire 78 which is maintained energized by source 80.

When the desired quantity of sterile liquid has been dispensed, valve 10 readily may be closed by reversely rotating handle 62 until the valve closure members 64 and 48 reach the closed position as shown in FIG. 1. It is to be noted that seating of inner valve closure member 64 is ensured, because inner and outer valve seats 18 and 24 are spaced so that inner valve closure member 64 seats about one-quarter of a turn before outer valve closure member.

As mentioned above, the coils of heating wire 78 surround outlet 26 as well as wall portion 22 and outer seat 24, in addition to intermediate cylindrical wall portion 20. As a consequence, with valve 10 closed, as shown in FIG. 1, the secondary chamber formed by such intermediate wall 20, inner seat 18 and sealing surface 72 of annulus 64, as well as head 52, sealing surface 54 and outer seat 24, creates a miniature autoclave which definitely produces a dry interface between sealing surface 54 and outer seat 24 and vaporizes liquid which may be trapped in such secondary chamber likewise to sterilize the same.

In a typical installation employing sterile water, the energized wire 78 is designed to create a temperature in such secondary chamber of about 250°F (121°C), and a pressure of 15 pounds per square inch guage to effectively sterilize such trapped water by converting the same to steam. Thus, the steam (sterilized water vapor) can escape back to the cooler sterile water supply above inner closure member 64 by overcoming the force of spring 76, whereupon such steam immediately condenses for reuse, while the energized heating wire 78 maintains the desired sterile conditions at the inner and outer valve seats and within outlet 26. As is apparent, the spring rate may be adjusted for the vapor pressure of the particular liquid being used.

Turning now to FIGS. 3 and 4, an automatically actuated embodiment of the inventive valve is indicated generally at 100. However, most of the elements of this valve are the same as in the manual embodiment; hence the same numerals are used for the same or similar elements, and only the differences will be described below.

Thus, valve 100 includes a valve body 12 and outer valve closure member 48 which are the same as those employed in FIGS. 1 and 2, with the following exceptions. Stem 500 of outer valve closure member 48 is considerably shorter than stem 50 of FIG. 1, and both internally threaded portion 40 and externally threaded portion 58 are eliminated, while the upper end 600 of the stem is suitably connected to an automatic actuating mechanism 620, preferably in the form of a conventional solenoid operated electrical circuit. This connection preferably is made by a collar 622 suitably attached to such upper stem end 600 and to the lower end of a solenoid plunger 624, the coil 626 of which is connected across a suitable AC power source 628, with the energization and deenergization of solenoid coil 626 being controlled by the respective closing and opening of an on-off switch 630.

Accordingly, solenoid coil 626 is normally deenergized, with plunger 624 being biased downwardly by a suitable spring (not shown) to positively close outer valve closure member 48, as shown in FIG. 3. However, upon energization of solenoid coil 626 by closing switch 630, plunger 624 is urged upwardly (against the spring bias) to retract outer valve closure member 48 which picks inner valve closure member 64, with the enlarged lower portion of stem 500 bottoming against lower portion 42 in the open position of FIG. 4, just as stem 50 does in FIG. 2. Merely by reversing the position of switch 630 to the open position of FIG. 3, coil 626 is deenergized, whereupon solenoid plunger 624 is biased downwardly to automatically extend outer valve closure member 48 into the closed position in FIG. 3. Just as in FIG. 1, inner and outer valve seats 18 and 24 are arranged in such spaced relationship that inner valve closure member 64 is seated by spring 76 just before outer valve closure member 48 by the downwardly biased plunger 624, to ensure closing of the inner valve closure member.

As will be evident, the opening and closing of the modified embodiment of the valve illustrated in FIGS. 3 and 4 not only is automatic, but faster, in that only reciprocal movement of outer valve member 48 is required as opposed to the manual screw thread movement of the valve shown in FIGS. 1 and 2. However, in all other respects, and particularly in the sterilizing and vaporizing aspects, the operations of the two embodiments are the same.

It now will be seen how the invention accomplishes its various objectives. Likewise, it is to be understood that while the invention has been described and illustrated herein by reference to certain preferred embodiments, the same are to be considered as illustrative, rather than as limiting.

I claim:

1. A sterile liquid dispensing valve comprising: hollow body means having inlet means, outlet means, outer seat means between said inlet means and outlet means, and inner seat means between said inlet means and outer seat means; outer closure means; means for moving said outer closure means to engage and disengage said outer seat means; inner closure means movable relatively to said outer closure means; resilient means normally biasing said inner closure means to engage either said inner seat means or said outer closure means, with said inner and outer seat means being arranged so that during valve closing said inner closure means is seated before said outer closure means to ensure closing of said inner closure means; and heating means associated with said body means for sterilizing said outlet means and vaporizing liquid which may be trapped between said inner and outer closure means when seated, whereby such vaporized liquid can escape by forcing said inner closure means to disengage said inner seat means against the bias of said resilient means.

2. The valve of claim 1 wherein said body means include an elongated chamber having one end reduced to form said inner and outer seat means and terminating in said outlet means, and a plug removably closing the other end of said chamber, with said inlet means communicating with said chamber intermediate said ends.

3. The valve of claim 1 wherein said outer closure means include an elongated stem having one end enlarged to engage said outer seat means; and said moving means include an actuator operatively associated with the other end of said stem.

4. The valve of claim 1 wherein said inner closure means include an annulus surrounding said outer closure means and having one end engageable with said outer closure means and an outer peripheral portion engageable with said inner seat means; and said resilient means include a helical compression spring surrounding said outer closure means and compressed between said body means and the other end of said inner closure means.

5. The valve of claim 1 wherein said heating means include an electrical resistance wire coiled around said outlet means and said outer seat means, and a power source for energizing said wire.

6. The valve of claim 1 wherein said body means include an elongated chamber having one end reduced to form said inner seat means, further reduced to form said outer seat means and terminating in said outlet means, and a plug removably closing the other end of said chamber and having a through bore, with said inlet means communicating with said chamber between said ends; said outer closure means include an elongated stem having one end enlarged to engage said outer seat means and an intermediate portion extending through said bore; and said moving means include an actuator operatively associated with the other end of said stem.

7. The valve of claim 6 wherein said bore is internally threaded; said intermediate stem portion is externally threaded and operatively engages said bore; and said actuator includes a handle on said other stem end for manually advancing and retracting said stem.

8. The valve of claim 6 wherein said moving means include power-actuated means for automatically advancing and retracting said stem.

9. The valve of claim 6 wherein said inner closure means include an annulus surrounding said stem and having one end engageable with said enlarged end of said stem and an intermediate portion engageable with said inner seat means; and said resilient means include a helical compression spring surrounding said stem and compressed between said plug and the other end of said annulus.

10. The valve of claim 9 wherein said heating means include an electrical resistance wire coiled around said outlet means and said outer seat means, and a power source for energizing said wire.

* * * * *